US010830310B2

(12) United States Patent
Hudson et al.

(10) Patent No.: US 10,830,310 B2
(45) Date of Patent: Nov. 10, 2020

(54) GEAR ASSEMBLY (71) Applicant: Lear Corporation, Southfield, MI (US)

(72) Inventors: Curtis Hudson, Macomb, MI (US);
Mladen Humer, West Bloomfield, MI
(US); Mark R. Keyser, Lake Orion,
MI (US)

(73) Assignee: Lear Corporation, Southfield, MI (US)

( * ) Notice: Subject to any disclaimer, the term of this
patent is extended or adjusted under 35
U.S.C. 154(b) by 0 days.

(21) Appl. No.: 16/288,455

(22) Filed: Feb. 28, 2019

(65) Prior Publication Data
US 2020/0278009 A1 Sep. 3, 2020

(51) Int. Cl.
F16H 57/08 (2006.01)
F16H 1/28 (2006.01)
F16H 1/16 (2006.01)
F16H 37/04 (2006.01)
B60N 2/02 (2006.01)
B60N 2/10 (2006.01)

(52) U.S. Cl.
CPC ............ F16H 1/28 (2013.01); B60N 2/0232
(2013.01); B60N 2/10 (2013.01); F16H 1/16
(2013.01); F16H 37/041 (2013.01); F16H
57/08 (2013.01); B60N 2002/0236 (2013.01);
F16H 2001/2881 (2013.01)

(58) Field of Classification Search
None
See application file for complete search history.

(56) References Cited

U.S. PATENT DOCUMENTS

| 3,972,563 | A | 8/1976 | Gustafsson |
| 4,641,887 | A | 2/1987 | Klueting |
| 5,435,794 | A * | 7/1995 | Mori .................... B60K 17/046 |
| | | | 475/338 |
| 5,462,498 | A | 10/1995 | Lindblad |
| 5,484,345 | A * | 1/1996 | Fukaya ................. F16H 37/041 |
| | | | 475/162 |
| 6,158,811 | A | 12/2000 | Hofschulte et al. |
| 6,543,850 | B1 | 4/2003 | Becker et al. |
| 6,837,824 | B2 * | 1/2005 | Reimann ................ B62D 5/008 |
| | | | 180/443 |
| 8,974,000 | B2 | 3/2015 | Navatte et al. |
| 9,033,849 | B2 | 5/2015 | Klein et al. |
| 9,421,891 | B2 | 8/2016 | Andres et al. |
| 2003/0139250 | A1 * | 7/2003 | Bowman .............. B60K 7/0007 |
| | | | 475/338 |

(Continued)

FOREIGN PATENT DOCUMENTS

GB 2179997 A * 3/1987 ........... B60N 2/0232

Primary Examiner — Justin Holmes
(74) Attorney, Agent, or Firm — Fishman Stewart PLLC (57) ABSTRACT A gear assembly includes motor, a first gear, one or more planet gears, a first ring gear, and/or a second ring gear. The motor may be configured to rotate the first ring gear at a first speed and/or a second speed. The first gear may be configured to rotate the one or more planet gears. The planet gears may be configured to engage the first ring gear and/or rotate the second ring gear. The second speed may be greater than the first speed. Each of the one or more planet gears may include a first portion and/or a second portion. The first portion may include a first radius, and/or the second portion may include a second radius. The first radius may be larger than the second radius.

20 Claims, 10 Drawing Sheets (56) References Cited

U.S. PATENT DOCUMENTS

2003/0216213 A1* 11/2003 Yamamoto ................ F16H 1/28
  475/330
2010/0240490 A1   9/2010 Schafer
2016/0348759 A1  12/2016 McCloy
2018/0208081 A1*  7/2018 Iwatate ................ B60N 2/2231

* cited by examiner

GEAR ASSEMBLY

TECHNICAL FIELD

The present disclosure generally relates to gear assemblies, including gear assemblies that may be used in connection with motors, such as vehicle seat motors.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some gear assemblies may be relatively complex to use and/or to assemble. Additionally or alternatively, some gear assemblies may not be configured for wide ranges of output speeds and/or torque.

There is a desire for solutions/options that minimize or eliminate one or more challenges or shortcomings of gear assemblies. The foregoing discussion is intended only to illustrate examples of the present field and should not be taken as a disavowal of scope.

SUMMARY

In embodiments, a gear assembly may include motor, a first gear, one or more planet gears, a first ring gear, and/or a second ring gear. The motor may be configured to rotate the first ring gear at a first speed and/or a second speed. The first gear may be configured to rotate the one or more planet gears. The planet gears may be configured to engage the first ring gear and/or rotate the second ring gear. The second speed may be greater than the first speed. Each of the one or more planet gears may include a first portion and/or a second portion. The first portion may include a first radius, and/or the second portion may include a second radius. The first radius may be larger than the second radius. Each of the one or more planet gears may include a first portion and/or a second portion. The first portion may include a first radius, and/or the second portion may include a second radius. The first radius may be larger than the second radius. The first portion and/or the second portion may include the same number of teeth. The gear assembly may include a housing that may be connected to the motor. The first gear, the one or more planet gears, the first ring gear, and/or the second ring gear may be at least partially disposed in the housing. The housing may be configured for connection with a seat back.

With embodiments, the motor may be configured to rotate a seat back at a comfort speed and/or a rapid reposition speed. The first portions of the one or more planet gears may be configured to engage an inner surface of the first ring gear. The second portions of the one or more planet gears may be configured to engage an inner surface of the second ring gear to rotate the second ring gear. The bearing ring may be disposed substantially between the first ring gear and/or the second ring gear. The bearing ring may be configured to facilitate rotation between the first ring gear and/or the second ring gear. The first ring gear may be substantially fixed relative to the motor, and/or the second ring gear may be configured to rotate relative to the motor. The first portions may be configured to engage a first plurality of teeth disposed at the inner surface of the first ring gear. The second portions may be configured to engage a second plurality of teeth that may be disposed at the inner surface of the second ring gear. The first plurality of teeth and/or the second plurality of teeth may include the same number of teeth.

In embodiments, the one or more planet gears may not be operatively connected to a sun gear. The one or more planet gears may each be configured to rotate about a central axis and/or a respective planet gear axis. The first ring gear and/or the second ring gear may include different diameters. A method of operating a gear assembly may include providing a first ring gear, a second ring gear, and/or one or more planet gears. The one or more planet gears may each include a first portion and/or a second portion. The method may include rotating the one or more planet gears about a plurality of axes such that the one or more planet gears may engage the first ring gear and/or rotate the second ring gear. During rotating of the one or more planet gears, the first ring gear may be fixed, and/or the second ring gear may rotate. The one or more planet gears may rotate at a first speed, and/or the second ring gear may rotate at a second speed. The first speed may be greater than the second speed. The second ring gear may be connected to an output member that may be connected to a rod. The rod may be connected to a seat back, and/or the seat back may be configured to rotate with the rod, the output member, and/or the ring gear. The plurality of axes may include a central axis and/or a planet gear axis for each of the one or more planet gears. Each planet gear axis may be radially spaced form the central axis and/or circumferentially spaced form each other planet gear axis.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
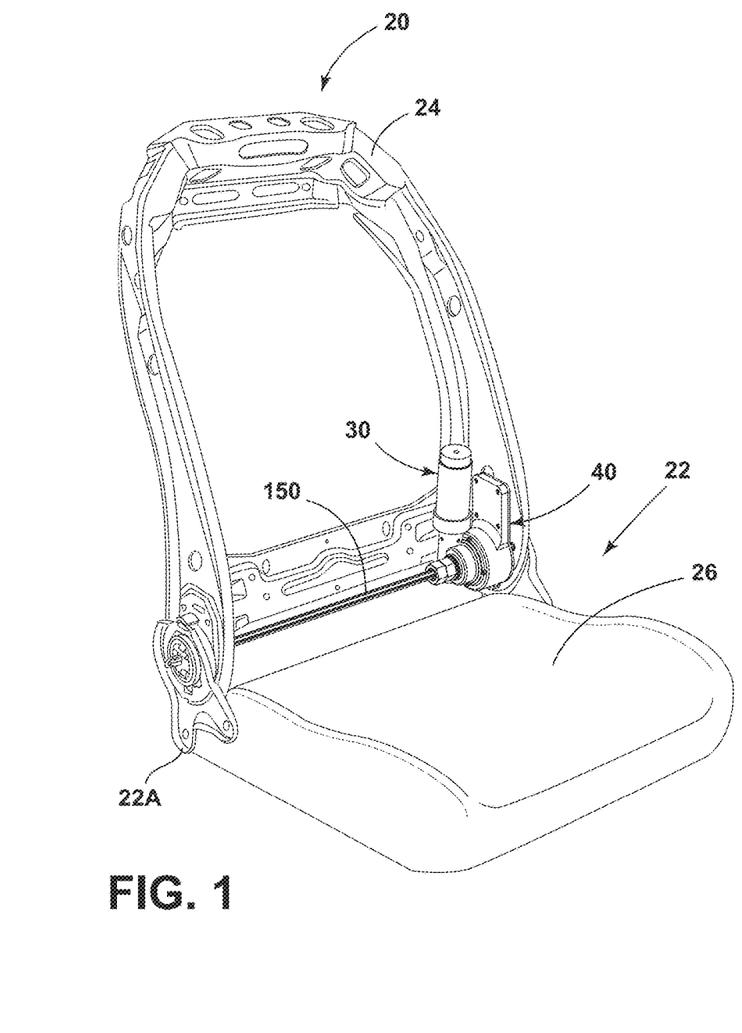
FIG. 1 is a perspective view generally illustrating an embodiment of a gear assembly and a seat according to teachings of the present disclosure.
Figure 2:
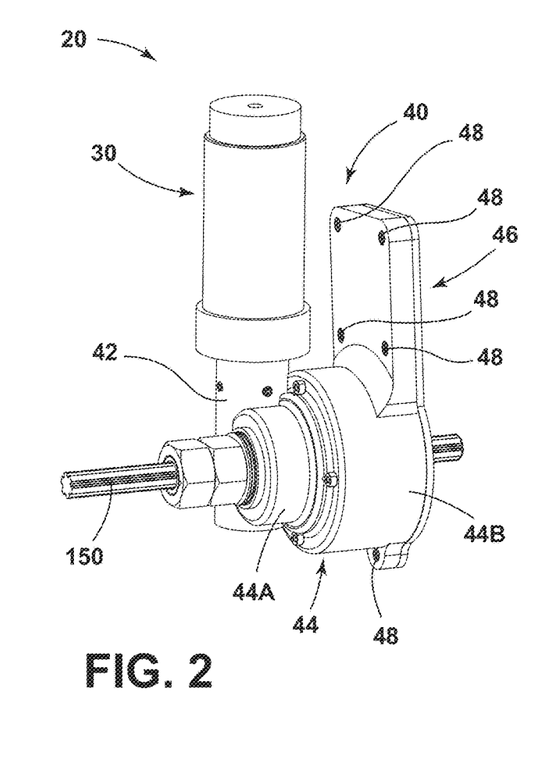
FIG. 2 is a perspective view generally illustrating an embodiment of a gear assembly according to teachings of the present disclosure.
Figure 3:
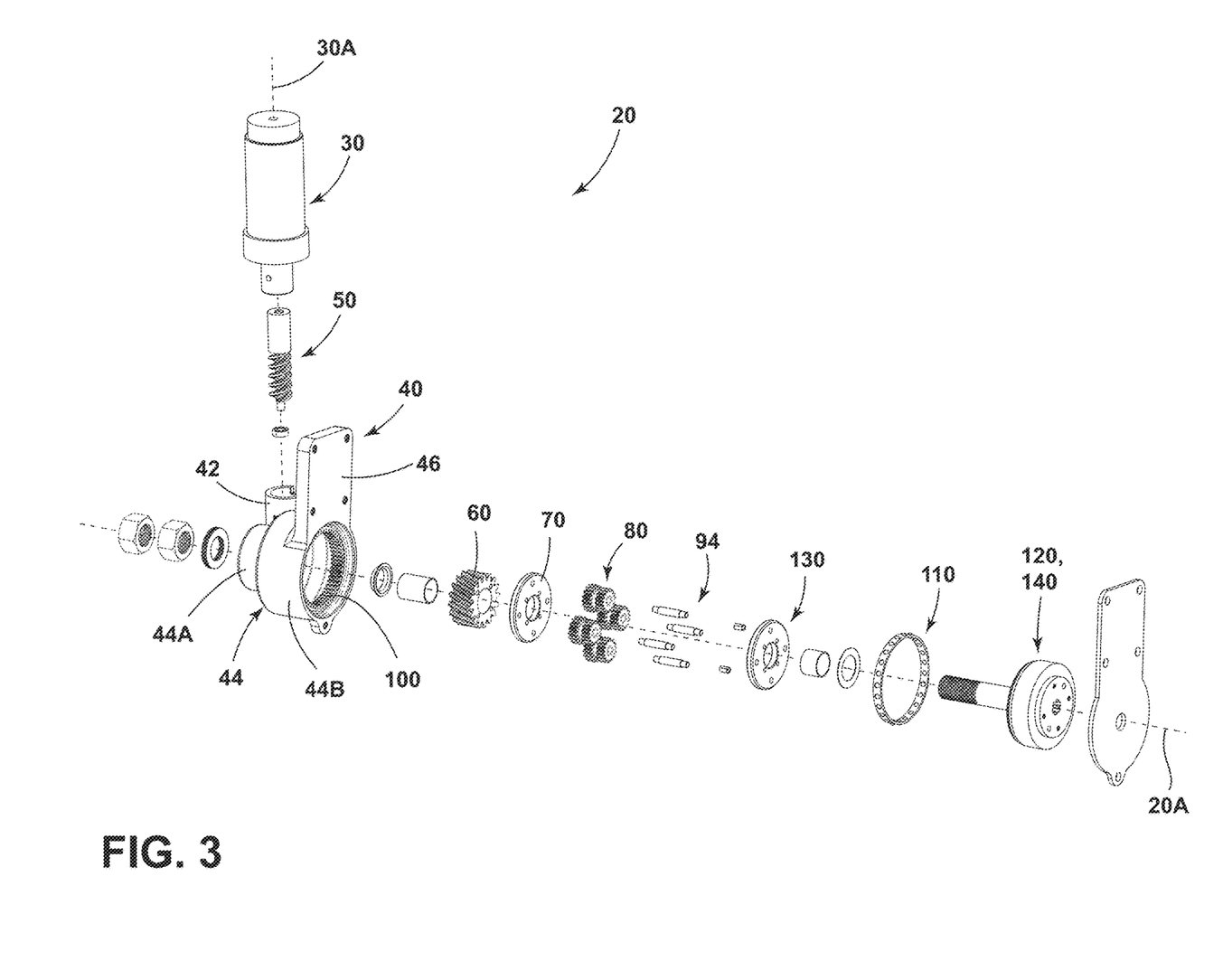
FIG. 3 is an exploded view generally illustrating portions of an embodiment of a gear assembly according to teachings of the present disclosure.

In embodiments, such as generally illustrated in FIGS. 1, 2, and 3, a gear assembly 20 may include a motor 30, a housing 40, a drive shaft/gear 50, a first gear 60, one or more planet gears 80, an output member 140, and/or a rod 150. The housing 40 may be configured to receive at least a portion of the drive shaft 50, the first gear 60, the one or more planet gears 80, the output member 140, and/or the rod 150. The gear assembly 20 may be connected to and/or incorporated with a seat 22 (e.g., a vehicle seat). The vehicle seat 22 may include a seat back 24 and/or seat base 26. The housing 40, the motor 30, and/or the rod 150 may be connected to the seat back 24. For example and without limitation, the rod 150 may be directly connected to the seat back 24 and/or may be operatively connected to the seat back 24 via a recliner. The gear assembly 20 may be configured to rotate (e.g., tilt) the seat back 24.

With embodiments, the gear assembly 20 may include a motor 30. The motor 30 may be configured to drive the gear assembly 20. The motor 30 may, for example and without limitation, be a brushless electric motor. The motor 30 may be configured to operate at one or more of a variety of speeds. For example and without limitation, the motor 30 may be configured to operate at a first motor speed (e.g., a low motor speed) and/or at a second speed (e.g., a high motor speed). The motor 30 may operate at the first motor speed when adjusting the tilt of the seat back 24 for the comfort of an occupant. The motor 30 may operate at the second motor speed if vehicle impact is detected or expected/predicted (e.g., a potential accident). If a vehicle impact is detected or expected/predicted, the motor 30 may quickly adjust (e.g., at the second motor speed) the seat back 24 to a safety position (e.g., upright) to reduce the risk of injury to an occupant.

In embodiments, such as generally illustrated in FIGS. 1, 2, 3, 4A, and 4B, the gear assembly 20 may include a housing 40. The housing 40 may be configured to receive at least a portion of the drive shaft 50, the first gear 60, the one or more planet gears 80, the output member 140, and/or the rod 150. Actuation of the gear assembly 20 may cause relative rotation between the housing 40 and the rod 150. The rod 150 may be connected to the seat base 26 and/or a frame 22A connected thereto (see, e.g., FIG. 1). The housing 40 may be connected to the seat back 24 such that upon actuating the motor 30, the housing 40 may rotate the seat back 24 about the rod 150 (e.g., rotation of the rod 150 may actuation one or more recliners of the seat 22 to cause movement/rotation of the seat back 24). The housing 40 may include one or more of a variety of shapes, sizes, and/or configurations. For example and without limitation, the housing 40 may be rectangular, circular, and/or rounded. The housing 40 may include a first portion 42, a second portion 44, and/or a third portion 46.

Figure 4A:
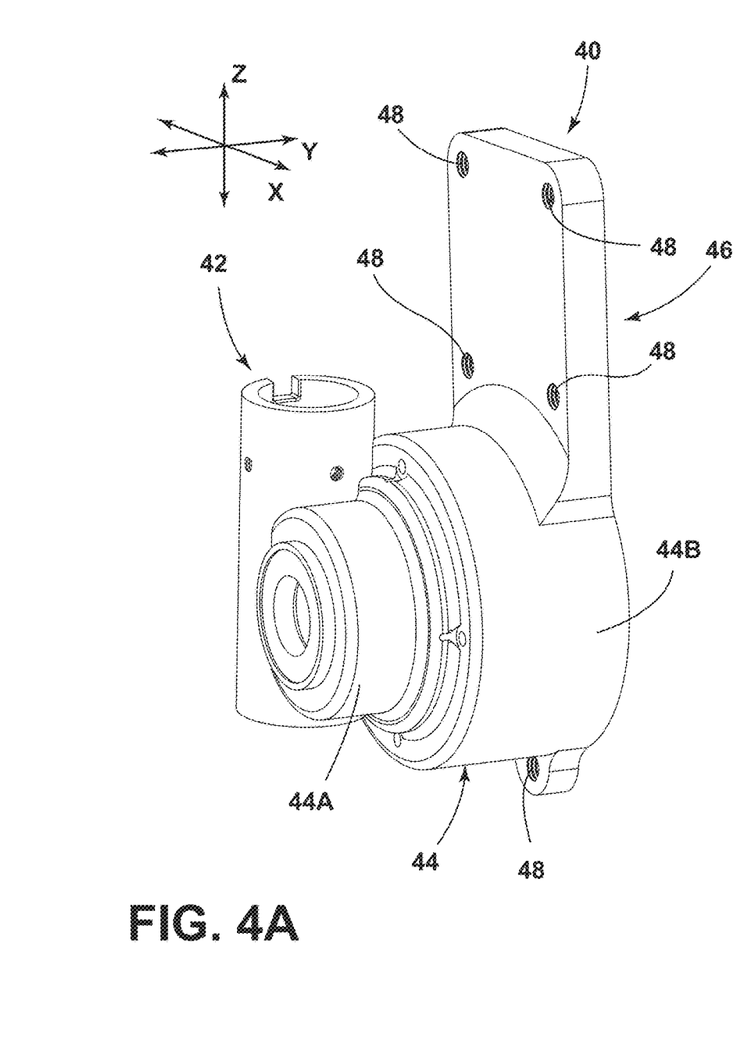
FIGS. 4A and 4B are perspective views generally illustrating an embodiment of a housing of a gear assembly according to teachings of the present disclosure.
Figure 4B:
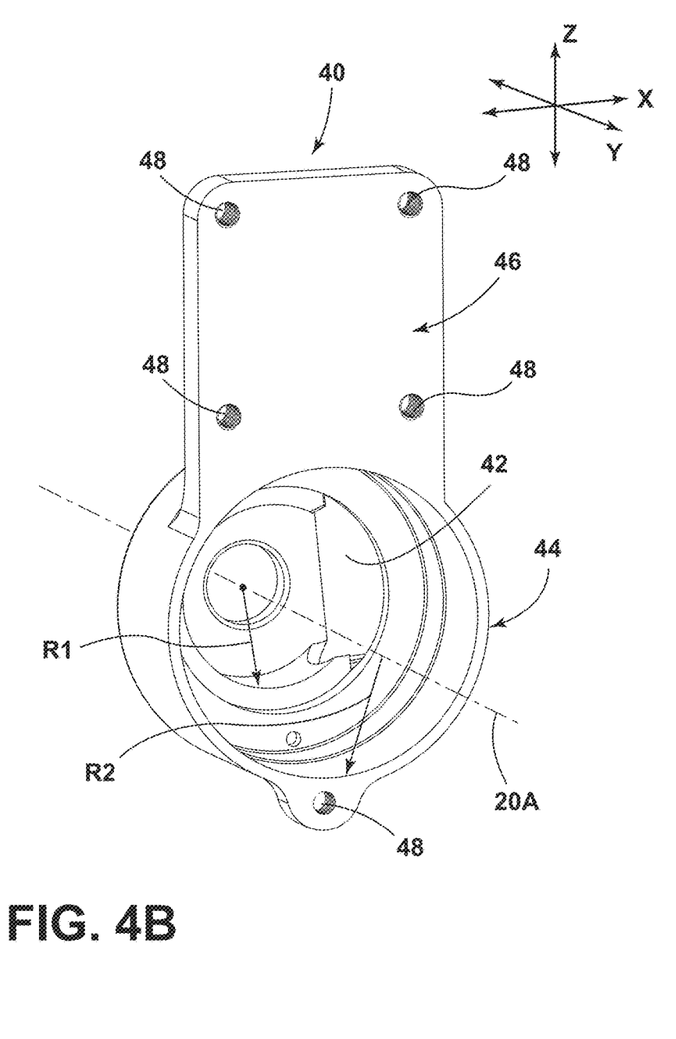

With embodiments, such as generally illustrated in FIGS. 4A and 4B, the first portion 42 may be substantially cylindrical and or rounded. The first portion 42 may extend substantially in the Z-direction. The first portion 42 may be configured to receive at least a portion of the drive shaft 50. The first portion 42 may be connected to the second portion 44 of the housing 40. The second portion 44 of the housing 40 may be substantially circular, rounded, and/or cylindrical. The second portion 44 may extend substantially in the Y-direction. The second portion 44 may be configured to receive at least a portion of the drive shaft 50, the first gear 60, the one or more planet gears 80, the output member 140, and/or the rod 150. The second portion 44 may include a first section 44A and/or a second section 44B. The first section 44A may include a first radius $R_1$, and/or the second section 44B may include a second radius $R_2$. The first radius $R_1$ may be smaller than the second radius $R_2$. The first section 44A and/or the second section 44B may substantially coaxial (e.g., share an axis substantially parallel to the Y-direction). The first section 44A may be configured to receive at least a portion of the first gear 60. The second section 44B may be configured to receive at least a portion of the one or more planet gears 80, the output member 140, and/or the rod 150.

In embodiments, the third portion 46 of the housing 40 may be configured to connect the housing 40 to the seat back 24. The third portion 46 may be substantially planar (e.g., in the X-Z plane) and/or rectangular. The third portion 46 may include one or more apertures 48, which may be configured to receive one or more fasteners 48A. The one or more fasteners 48A may connect the third portion 46 of the housing 40 to the seat back 24.

In embodiments, such as generally illustrated in FIGS. 3, 5A, 5B, and 5C, the gear assembly 20 may include a drive shaft/gear 50. The drive shaft 50 may be connected to the motor 30. The motor 30 may be configured to drive the drive shaft 50. The drive shaft 50 may extend substantially in the Z-direction, and/or may be configured to connect to the first gear 60. The drive shaft 50 may be substantially disposed in the first portion 42 and/or the second portion 44 of the housing 40. The drive shaft 50 may extend substantially in the Z-direction, and/or the drive shaft 50 may be configured to rotate about a motor axis 30A that may be substantially aligned with the Z-direction, at least in a comfort position of the seat 22. The drive shaft 50 may be configured to rotate in a first direction (e.g., a clockwise direction) and/or a second direction (e.g., a counterclockwise direction). If the drive shaft 50 rotates in the first direction, the seat back 24 may tilt in a first direction (e.g., rearward). If the drive shaft 50 rotates in the second direction, the seat back 24 may tilt in a second direction (e.g., forward).

Figure 5A:
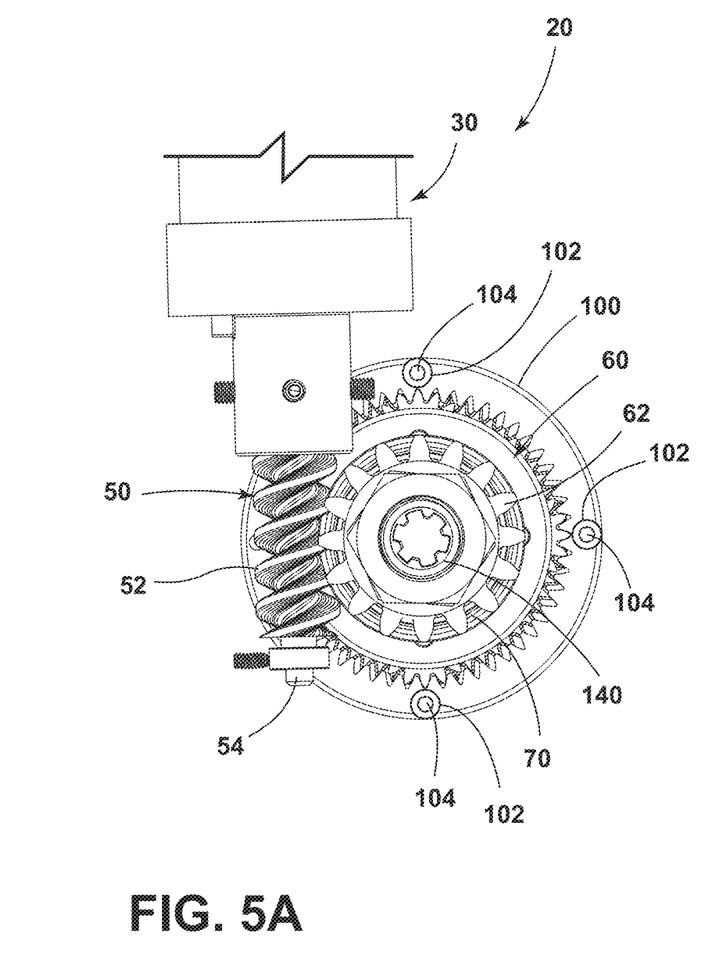
FIGS. 5A and 5B are side views generally illustrating portions of an embodiment of a gear assembly according to teachings of the present disclosure.
Figure 5B:
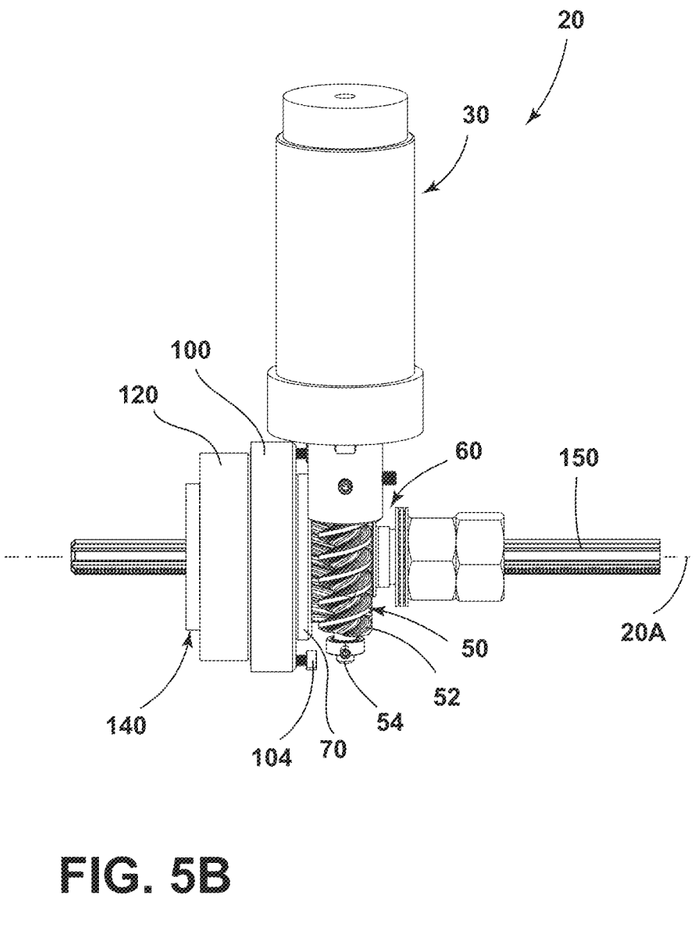
Figure 5C:
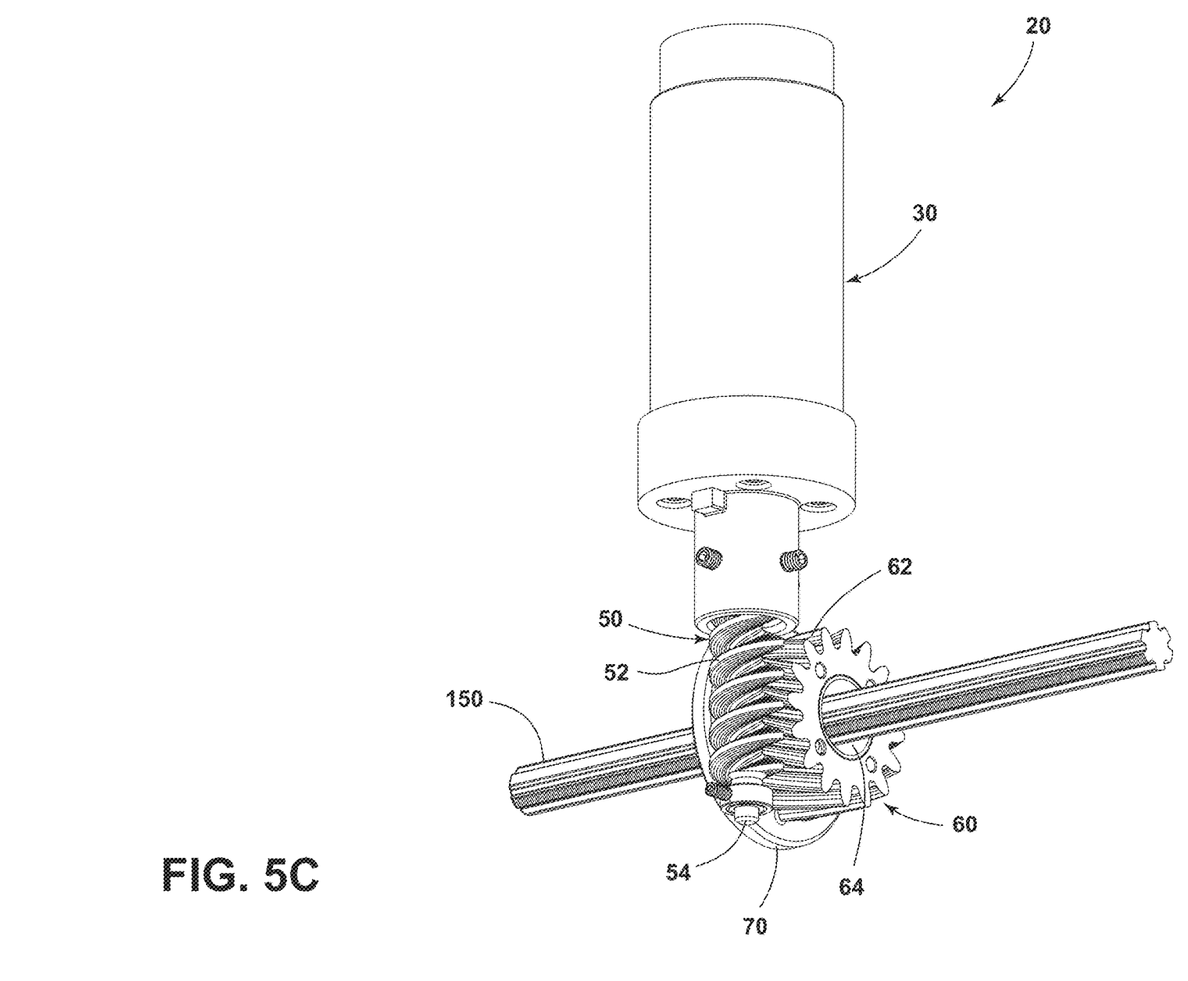
FIG. 5C is a perspective view generally illustrating portions of an embodiment of a gear assembly according to teachings of the present disclosure.
Figure 6A:
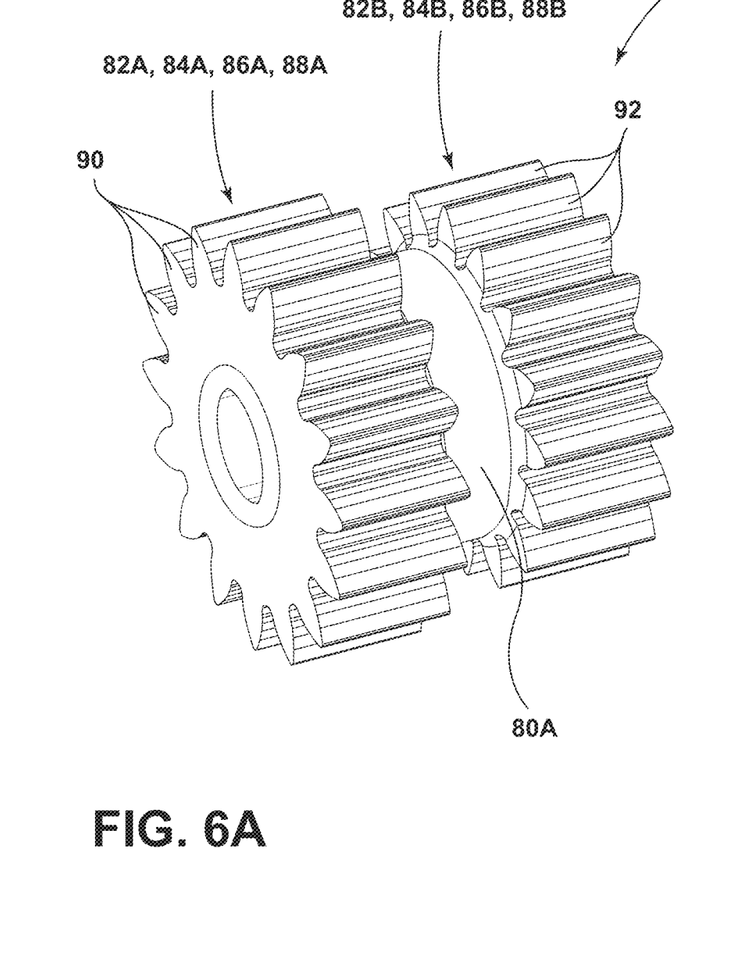
FIG. 6A is a perspective view generally illustrating portions of an embodiment of a planet gear of a gear assembly according to teachings of the present disclosure.
Figure 6B:
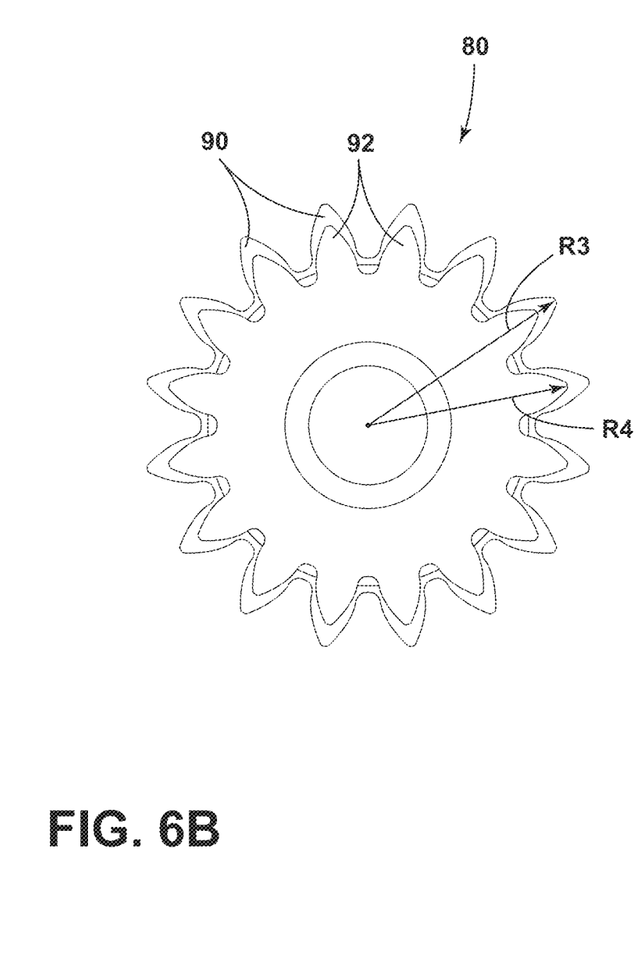
FIG. 6B is a side view generally illustrating portions of an embodiment of a planet gear of a gear assembly according to teachings of the present disclosure.

With embodiments, the drive shaft 50 may be substantially spiroid/spirally shaped and/or worm shaped. The drive shaft 50 may include one or more teeth 52 that may extend from a body 54 of the drive shaft 50. The teeth 52 may be configured to engage the first gear 60. For example and without limitation, the teeth 52 of the drive shaft 50 may be configured to rotate the first gear 60 in a first direction and/or a second direction. The drive shaft 50 may rotate about the motor axis 30A that may be substantially perpendicular to the axis of rotation of the first gear 60 (e.g., a central axis 20A), which may be substantially aligned with the Y-direction.

In embodiments, such as generally illustrated in FIG. 5C, the gear assembly 20 may include a first gear 60. The first gear 60 may be configured to rotate upon rotation of the drive shaft 50, such as via the motor 30. The first gear 60 may include one or more of a variety of shapes, sizes, and/or configurations. For example and without limitation, the first gear 60 may be substantially helical. The first gear 60 may include one or more teeth 62 that may be configured to at least partially engage the teeth 52 of the drive shaft 50. As the teeth 52 of the drive shaft 50 engage the teeth 62 of the first gear 60, the first gear 60 may rotate. Engagement between the drive shaft 50 and the first gear 60 may provide/result in a first gear reduction (e.g., the drive shaft 50 may rotate at a greater rate than the first gear 60). The first gear 60 may include an aperture 64 that may be disposed in a center of the first gear 60. The aperture 64 may be configured to receive at least a portion of the rod 150. The first gear 60 may be configured to rotate about an axis (e.g., central axis 20A) substantially aligned with the Y-direction and/or may not materially engage the rod 150.

With embodiments, such as generally illustrated in FIGS. 3, 5B, and 5C, the gear assembly 20 may include a first carrier member 70 and/or the first gear 60 may be connected to the first carrier member 70. The first carrier member 70 may be configured to rotate with the first gear 60 (e.g., in the same direction and/or at the same speed). The first carrier member 70 may include one or more of a variety of shapes, sizes, and/or configurations. For example and without limitation, the first carrier member 70 may be substantially planar and/or circular (e.g., may be disc-shaped). The first carrier member 70 may be connected to the first gear 60 and/or the first carrier member 70 may be in flush contact with the first gear 60. For example and without limitation the first carrier member 70 may be rigidly fixed to the first gear 60.

In embodiments, such as generally illustrated in FIGS. 3, 6A, 6B, 7A, and 7B, the gear assembly 20 may include one or more planet gears 80. For example and without limitation, the gear assembly 20 may include three to six planet gears, such as a first planet gear 82, a second planet gear 84, a third planet gear 86, and/or a fourth planet gear 88. The planet gears 80 may be configured to rotate with the first carrier member 70. The planet gears 80 may include a first portion 82A, 84A, 86A, 88A and a second portion 82B, 84B, 86B, 88B (see, e.g., FIGS. 6A and 6B). The first portion 82A, 84A, 86A, 88A may include an outer radius $R_3$, and/or the second portion 82B, 84B, 86B, 88B may include an outer radius $R_4$. The first outer radius $R_3$ may be greater than the outer radius $R_4$. The first portion 82A, 84A, 86A, 88A may include one or more first teeth 90, and/or the second portion 82B, 84B, 86B, 88B may include one or more second teeth 92. The number of first teeth 90 and second teeth 92 may be the same. The planet gears 80 may include a connecting portion 80A that may be configured to connect the first portion 82A, 84A, 86A, 88A to the second portion 82B, 84B, 86B, 88B (see, e.g., FIG. 6A). The connecting portion 80A may, for example and without limitation, be substantially cylindrical. The first portion 82A, 84A, 86A, 88A and/or the second portion 82B, 84B, 86B, 88B may rotate at the same speed (e.g., in degrees of rotations per second about the pins 94) and/or in the same direction.

Figure 7A:
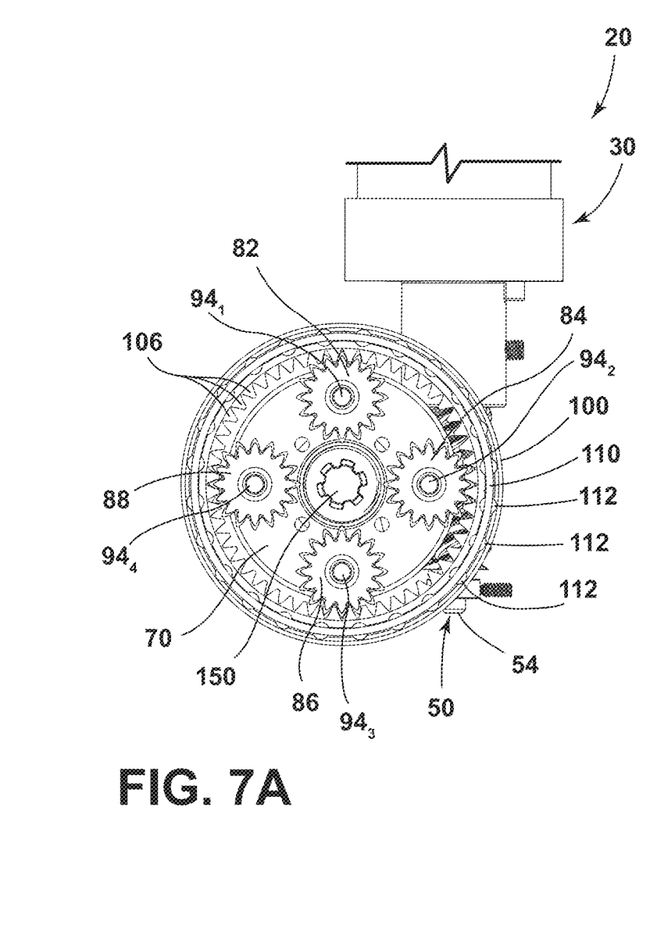
FIG. 7A is a cross-sectional view generally illustrating portion of an embodiment of a gear assembly according to teachings of the present disclosure.
Figure 7B:
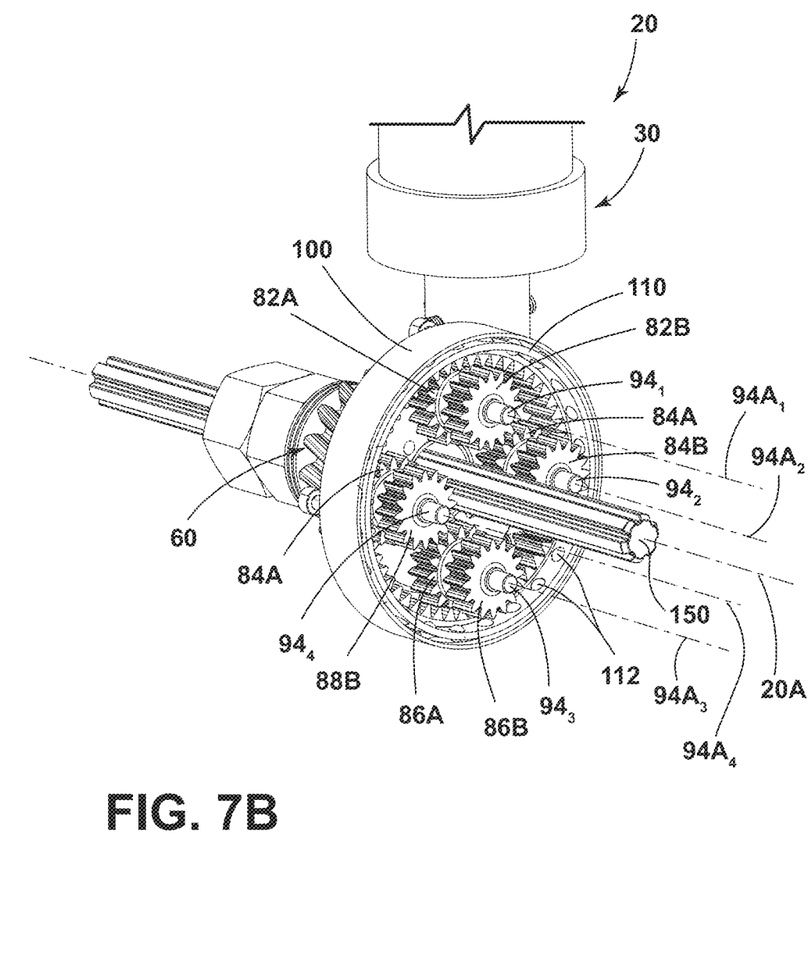
FIG. 7B is a perspective view generally illustrating portions of an embodiment of a gear assembly according to teachings of the present disclosure.

With embodiments, such as generally illustrated in FIGS. 3, 7A, and 7B, the gear assembly 20 may include one or more pins 94, and/or the planet gears 80 may be connected to the first carrier member 70 via one or more pins 94. The planet gears 80 may be configured to rotate about respective pins 94. For example and without limitation, the first planet gear 82 may be connected to the first carrier member 70 via a pin $94_1$, and/or the first planet gear 82 may rotate via the pin $94_1$. The second planet gear 84 may be connected to the first carrier member 70 via a pin $94_2$, and/or the second planet gear 84 may rotate via the pin $94_2$. The third planet gear 86 may be connected to the first carrier member 70 via a pin $94_3$, and/or the third planet gear 86 may rotate via the pin $94_3$. The fourth planet gear 88 may be connected to the first carrier member 70 via a pin $94_4$, and/or the fourth planet gear 88 may rotate via the pin $94_4$. The first gear 60 may rotate, which may cause the first carrier member 70 to rotate, which may cause the pins 94 to rotate about/relative to the rod 150, which may cause the planet gears 80 to rotate about/relative to the rod 150.

In embodiments, such as generally illustrated in FIGS. 3, 5A, 5B, 7A, and 7B, the gear assembly 20 may include a first ring gear 100. The first ring gear 100 may be configured to at least partially receive the planet gears 80. The first ring gear 100 may include one or more of a variety of shapes, sizes, and/or configurations. For example and without limitation, the first ring gear 100 may be substantially circular and/or may be centered on an axis (e.g., central axis 20A) that may be substantially aligned with the Y-direction and/or the rod 150. The first ring gear 100 may be configured to be fixed to the housing 40 or may be integrated with the housing 40. The first ring gear 100 may include one or more apertures 102 that may be configured to at least partially receive one or more fasteners 104 for connecting the first ring gear 100 to the housing 40 (see, e.g., FIG. 5A). The first ring gear 100 may remain fixed during rotation of the planet gears 80. The first ring gear 100 may include one or more teeth 106. The teeth 106 may disposed about an inner surface of the first ring gear 100. The teeth 106 may be configured to at least partially engage the first teeth 90 of the first portions 82A, 84A, 86A, 88A of the planet gears 80. If the first carrier member 70 rotates, some or all of the planet gears 80 may engage the teeth 106 of the first ring gear 100. The second portion 82B, 84B, 86B, 88B of the planet gears 80 may not be in contact or engagement with the first ring gear 100.

Figure 8A:
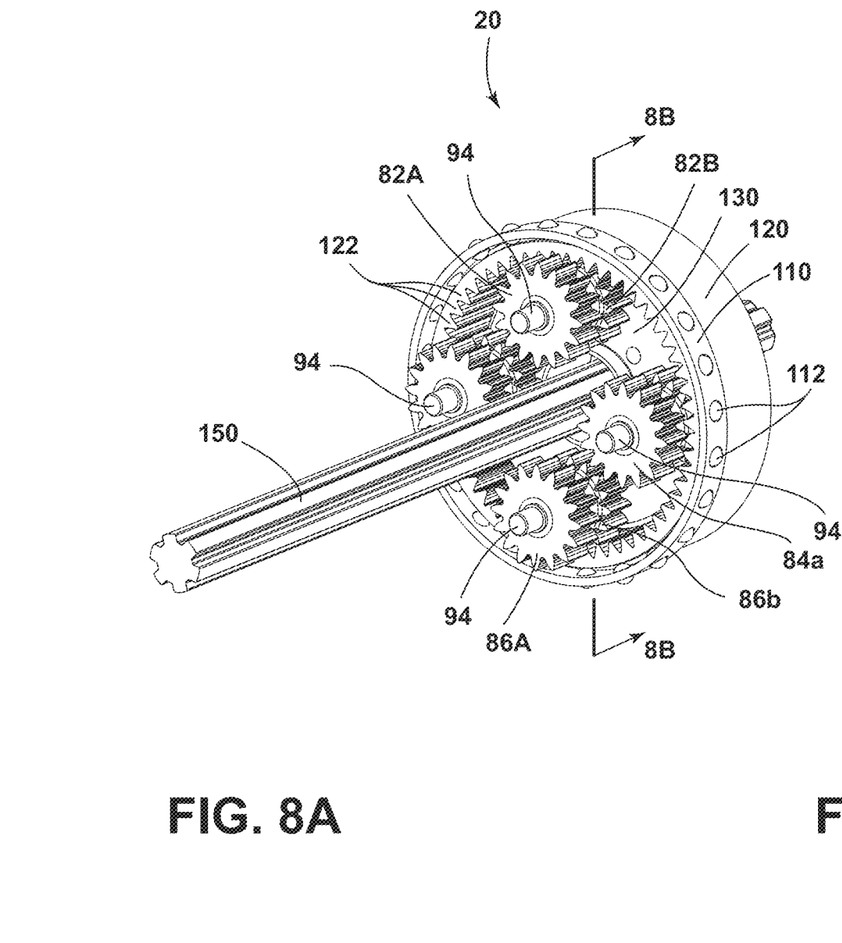
FIG. 8A is a perspective view generally illustrating portions of an embodiment of a gear assembly according to teachings of the present disclosure.
Figure 8B:
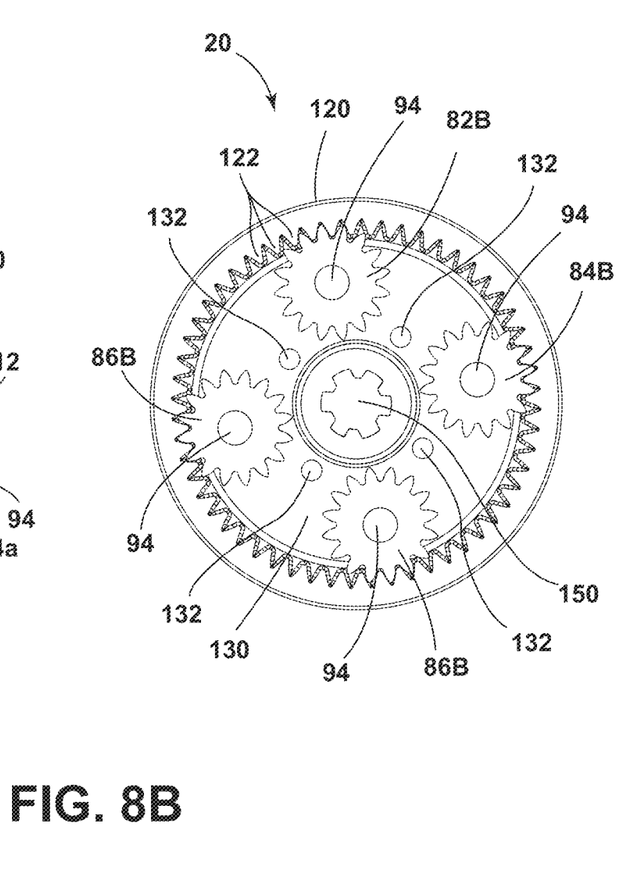
FIG. 8B is a cross-sectional view generally illustrating portions of an embodiment of a gear assembly according to teachings of the present disclosure.

With embodiments, the gear assembly 20 may include a bearing ring 110 (see, e.g., FIGS. 7A, 7B, 8A, and 8B), and/or a second ring gear 120 (see, e.g., FIGS. 8A and 8B). The bearing ring 110 may facilitate rotation of the second ring gear 120. The bearing ring 110 may include one or more bearings 112 disposed about the circumference of the bearing ring 110. The bearings 112 may facilitate relative rotation between the first ring gear 100 and the second ring gear 120. For example and without limitation, the second ring gear 120 may rotate relative to the first ring gear 100, which may be fixed to the housing 40 and/or the first ring gear 100 may rotate with the housing 40 relative to the second ring gear 120. The bearings 112 may be in contact with the first ring gear 100 (e.g., in inner surface of the first ring gear 100) and the second ring gear 120 (e.g., an outer surface of the second ring gear 120), and/or the bearings 112 may significantly reduce friction between the first ring gear 100 and the second ring gear 120. The bearing ring 110 may be substantially circular and/or may be disposed at least partially between the first ring gear 100 and the second ring gear 120.

In embodiments, such as generally illustrated in FIGS. 5B, 8A, and 8B, the gear assembly 20 may include a second ring gear 120. The second ring gear 120 may be configured to rotate upon rotation of the planet gears 80. The second ring gear 120 may include one or more of a variety of shapes, sizes, and/or configurations. For example and without limitation, the second ring gear 120 may be substantially circular and/or ring-shaped. The second ring gear 120 may include one or more teeth 122. The one or more teeth 122 may be disposed on an inner surface of the second ring gear 120. The one or more teeth 122 may be configured to at least partially engage the second portions 82B, 84B, 86B, 88B of the planet gears 80. The second ring gear 120 may be configured to rotate as the planet gears 80 rotate with the first carrier member 70. A second gear reduction may be provided by the connection between the first portions 82A, 84A, 86A, 88A of the planet gears 80 with the first ring gear 100 and the connection of the second portions 82B, 84B, 86B, 88B of the planet gears 80 with the second ring gear 120. For example and without limitation, the planet gears 80 may rotate at a first speed (e.g., with the first carrier member 70 about the central axis 20A) and/or the second ring gear 120 may rotate at a second speed about the central axis 20A that may be different (e.g., less) than the first speed.

Figure 9A:
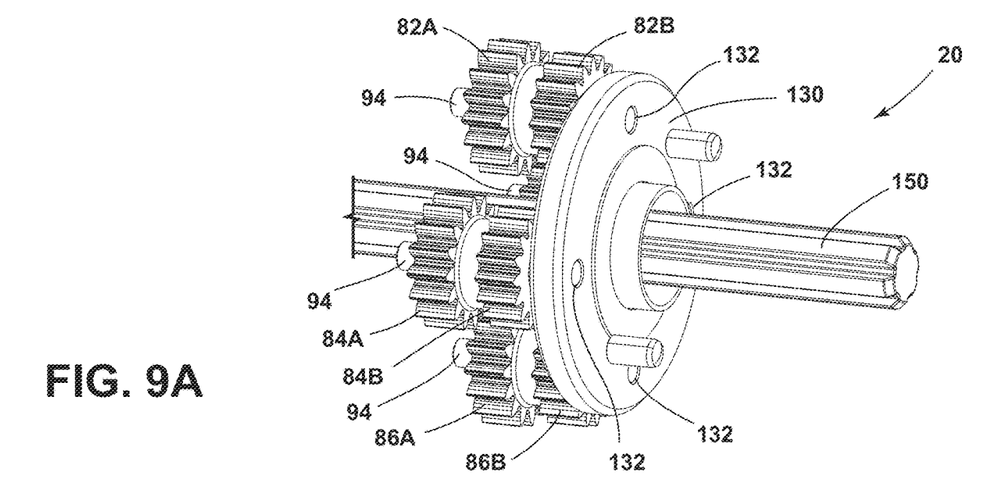
FIG. 9A is a perspective view generally illustrating portions of an embodiment of a gear assembly according to teachings of the present disclosure.
Figure 9B:
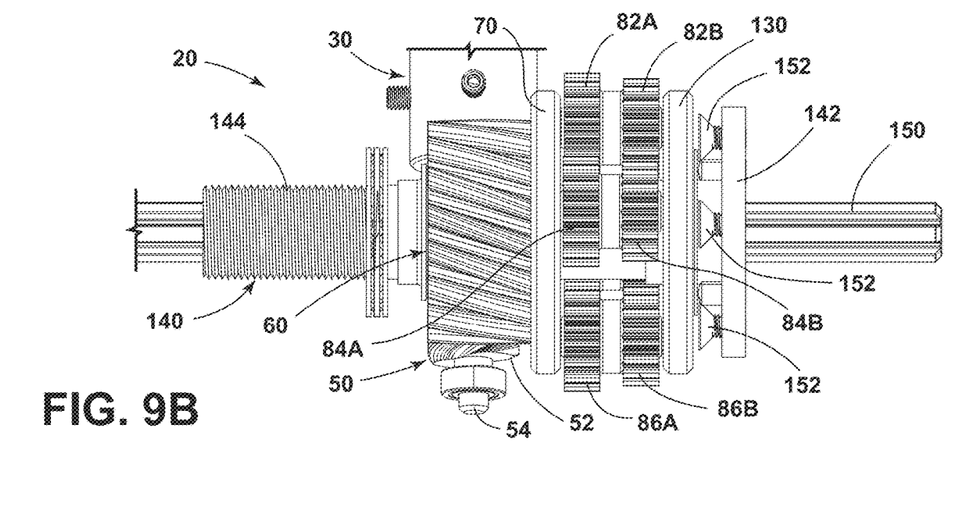
FIG. 9B is a side view generally illustrating portions of an embodiment of a gear assembly according to teachings of the present disclosure.

With embodiments, such as generally illustrated in FIGS. 3, 9A, and 9B, the gear assembly 20 may include a second carrier member 130. The second portions 82B, 84B, 86B, 88B of the planet gears 80 may be connected to the second carrier member 130 via the pins 94. The first carrier member 70, the second carrier member 130, the pins 94, and/or the planet gears 80 may rotate together. The second carrier member 130 may include one or more apertures or recesses 132 that may be configured to at least partially receive and/or support the pins 94. The second carrier member 130 may not be connected to the second ring gear 120 and/or may not be fixed to the second ring gear 120. The planet gears 80 may be disposed at least partially axially between the first carrier member 70 and the second carrier member 130.

In embodiments, such as generally illustrated in FIGS. 3, 9B, 10A, and 10B, the gear assembly 20 may include an output member 140. The output member 140 may be configured to rotate with the second ring gear 120 and/or with the rod 150. The output member 140 may include one or more of a variety of shapes, sizes, and/or configurations. For example and without limitation, the output member 140 may be substantially rounded, elongated, cylindrical, and/or planar. The output member 140 may include a first portion 142 and/or a second portion 144. The first portion 142 may be substantially planar and/or circular. The second portion 144 may be substantially cylindrical and/or may extend substantially in the Y-direction. The first portion 142 may be disposed at an end of the second portion 144. The first portion 142 and/or the second portion 144 may be configured to receive at least a portion of the rod 150. The first portion 142 and/or the second portion 144 may include a rod aperture 146. The rod aperture 146 may receive at least a portion of the rod 150. The rod aperture 146 may include one or more of a variety of shapes, sizes, and/or configurations. For example and without limitation, the rod aperture 146 may be substantially the same shape as the rod 150 (e.g., the rod 150 and the rod aperture 146 may form a key configuration/engagement). The rod 150 and/or the rod aperture 146 may be substantially star shaped and/or may include corresponding recesses and protrusions. The rod aperture 146 may be star shaped and/or circular shaped.

Figure 10A:
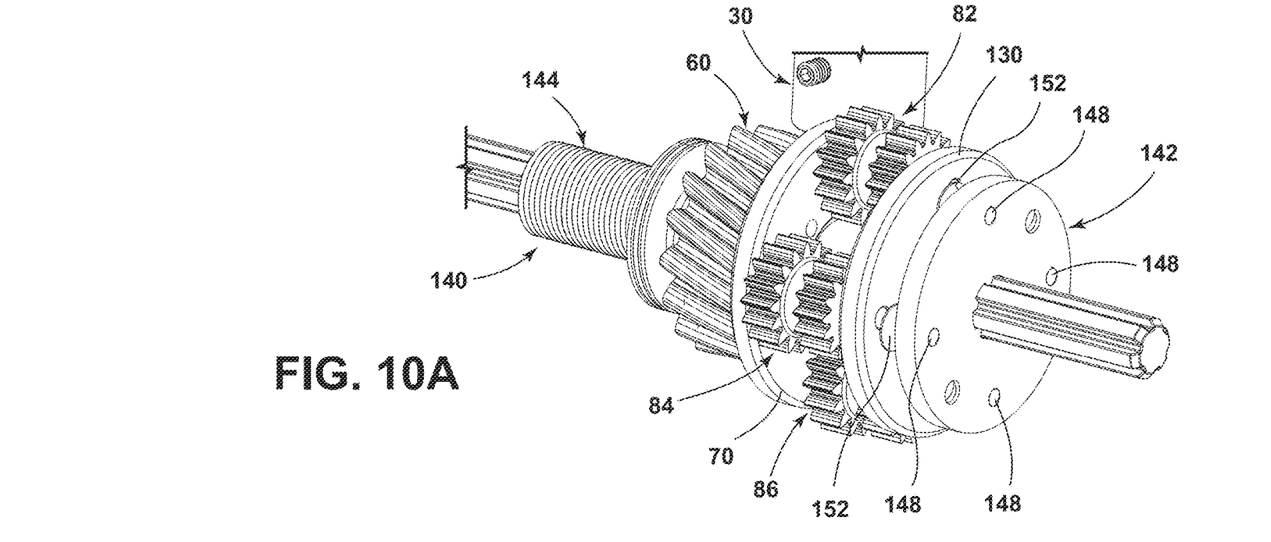
FIG. 10A is a perspective view generally illustrating portions of an embodiment of a gear assembly according to teachings of the present disclosure.
Figure 10B:
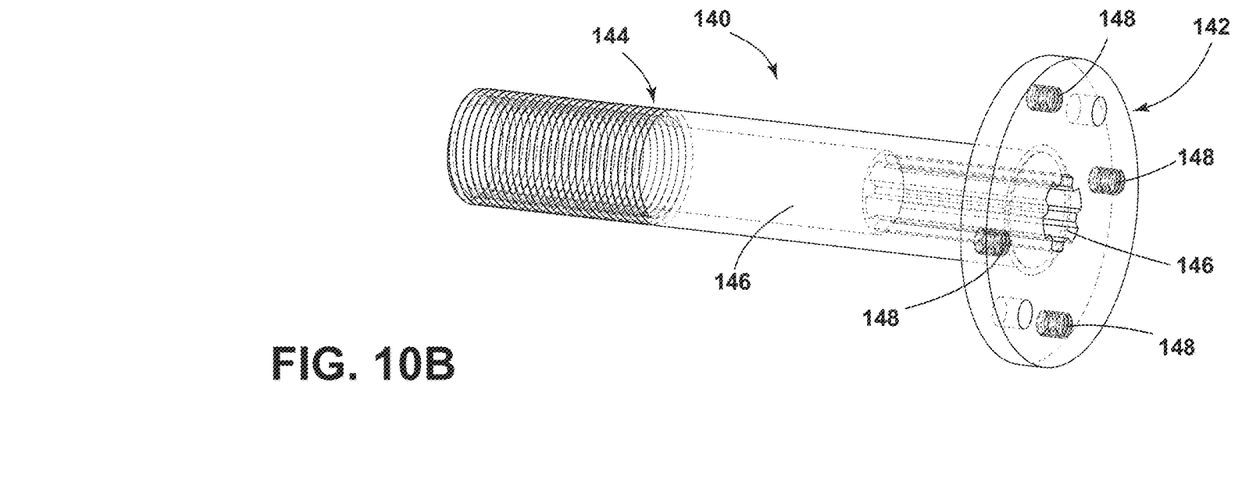
FIG. 10B is a perspective view generally illustrating portions of an embodiment of an output member of a gear assembly according to teachings of the present disclosure.

With embodiments, such as generally illustrated in FIG. 10A, the first portion 142 of the output member 140 may include one or more recesses and/or apertures 148. The one or more apertures 148 may be configured to receive one or more fasteners 152. The apertures 148 and/or fasteners 152 may connect the output member 140 to the second ring gear 120. The output member 140 may rotate in the same direction and/or may rotate at the same speed as the second ring gear 120.

In embodiments, a method of operating a gear assembly 20 may include providing a housing 40, a drive shaft 50, a first gear 60, one or more planet gears 80, a first ring gear 100, a second ring gear 120, and/or an output member 140. The method may include rotating the drive shaft 50, which may rotate the first gear 60. The method may include providing a first gear reduction via the drive shaft 50 and the first gear 60. The method may include the first gear 60 rotating the one or more planet gears 80, such as about a central axis 20A. For example and without limitation, the pins 94 may rotate with the first gear 60 and/or the first carrier member 70 about the central axis 20A, which may cause the planet gears 80 to rotate about the central axis 20A. As the planet gears 80 rotate about the central axis 20A, the planet gears 80 (e.g., the first portions 82A, 84A, 86A, 88A) may engage the first ring gear 100, which may cause the planet gears 80 to rotate about respective planet gear axes $94A_1$, $94A_2$, $94A_3$, $94A_4$. The planet gear axes $94A_1$, $94A_2$, $94A_3$, $94A_4$ may be aligned with pins $94_1$, $94_2$, $94_3$, $94_4$, respectively, may be radially spaced from the central axis 20A, and/or may be radially spaced from each other (see, e.g., FIG. 7B). For example and without limitation, some or all of the planet gears 80 may rotate about two different axes simultaneously. Rotation of the planet gears 80 about the planet gear axes $94A_1$, $94A_2$, $94A_3$, $94A_4$ may involve the second portions 82B, 84B, 86B, 88B engaging the second ring gear 120, which may cause rotation of the second ring gear 120, the output member 140, and/or the rod 150. The second ring gear 120 may be connected to the output member 140, and/or the second ring gear 120 may be configured to rotate (e.g., drive) the output member 140. The output member 140 may be operatively coupled to the rod 150 and/or the method may include driving the rod 150 via the output member 140. The rod 150 may be operatively coupled to the seat back 24 (e.g., via a recliner), and/or the seat back 24 may rotate as the rod 150 rotates.

With embodiments, the method may include providing a second gear reduction, such as via the one or more planet gears 80, the first ring gear 100, and the second ring gear 120. For example, the second portions 82B, 84B, 86B, 88B may be smaller than the first portions 82A, 84A, 86A, 88A (see, e.g., FIG. 6B) such that the planet gears 80 rotate faster relative to the first ring gear 100 than the second ring gear 120.

With embodiments, the second ring gear 120 and/or the rod 150 may be fixed (e.g., relative to a seat base 26), and rotation of the planet gears 80 may cause rotation of the first ring gear 100 and/or the housing 40 (which may be fixed to the seat back 24), which may cause rotation of the seat back 24.

In embodiments, the method may include operating the gear assembly 20 to provide a first output speed (e.g., a comfort speed) to adjust a seat back 24 relative to a seat base 26 (see, e.g., FIG. 1) in a range of comfort positions. The first output speed may, for example and without limitation, be about 3 degrees per second. Operating the gear assembly

20 at the first output speed may include operating the motor 30 at a first motor speed. The first motor speed may be greater than the first output speed. The difference between the first motor speed and the first output speed may be provided by the first gear reduction and/or the second gear reduction. The method may include operating the gear assembly 20 to provide a second output speed (e.g., a safety/rapid reposition speed) to quickly adjust the seat back 24, such as for safety purposes (e.g., to move the seat back 24 quickly forward if a rear end collision is predicted/ expected/detected). The second output speed may, for example and without limitation, be about 30 degrees per second and/or about ten times faster than the first output speed.

With embodiments, the planet gears 80 may be configured to share loads experienced by the gear assembly 20. Such load sharing may, for example and without limitation, limit and/or prevent high localized forces, which may permit the housing 40 to be made from different materials, such as a polymer with high internal damping, which may reduce the noise created by the gear assembly 20.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/ or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A gear assembly, comprising:
a motor;
a first gear;
one or more planet gears;
a first ring gear; and
a second ring gear;
wherein the motor is configured to rotate the first gear at a first speed and a second speed; the first gear is configured to rotate the one or more planet gears; the planet gears are configured to engage the first ring gear and rotate the second ring gear.

2. The gear assembly of claim 1, wherein the second speed is greater than the first speed.

3. The gear assembly of claim 1, wherein each of the one or more planet gears includes a first portion and a second portion; the first portion includes a first radius; the second portion includes a second radius; and the first radius is larger than the second radius.

4. The gear assembly of claim 3, wherein the first portion and the second portion include the same number of teeth.

5. The gear assembly of claim 1, including a housing connected to the motor; wherein the first gear, the one or more planet gears, the first ring gear, and the second ring gear are at least partially disposed in the housing; and the housing is configured for connection with a seat back.

6. The gear assembly of claim 1, wherein the motor is configured to rotate a seat back at a comfort speed and a rapid reposition speed.

7. The gear assembly of claim 1, wherein first portions of the one or more planet gears are configured to engage an inner surface of the first ring gear.

8. The gear assembly of claim 7, wherein second portions of the one or more planet gears are configured to engage an inner surface of the second ring gear to rotate the second ring gear.

9. The gear assembly of claim 8, including a bearing ring; wherein the bearing ring is disposed substantially between the first ring gear and the second ring gear.

10. The gear assembly of claim 9, wherein the bearing ring is configured to facilitate rotation between the first ring gear and the second ring gear; the first ring gear is substantially fixed relative to the motor; and the second ring gear is configured to rotate relative to the motor.

11. The gear assembly of claim 8, wherein the first portions are configured to engage a first plurality of teeth disposed at the inner surface of the first ring gear.

12. The gear assembly of claim 11, wherein the second portions are configured to engage a second plurality of teeth disposed at the inner surface of the second ring gear.

13. The gear assembly of claim 12, wherein the first plurality of teeth and the second plurality of teeth include the same number of teeth.

14. The gear assembly of claim 1, wherein the one or more planet gears are not operatively connected to a sun gear.

15. The gear assembly of claim 1, wherein the one or more planet gears are each configured to rotate about a central axis and a respective planet gear axis.

16. The gear assembly of claim 1, wherein the first ring gear and the second ring gear include different diameters.

17. A method of operating a gear assembly, comprising:
providing a first ring gear, a second ring gear, and one or more planet gears, the one or more planet gears each having a first portion and a second portion; and
rotating the one or more planet gears about a plurality of axes such that the one or more planet gears engage the first ring gear and rotate the second ring gear;
wherein during the rotating of the one or more planet gears, the first ring gear is fixed, and the second ring gear rotates.

18. The method of claim 17, wherein the one or more planet gears rotate at a first speed, the second ring gear rotates at a second speed; and the first speed is greater than the second speed.

19. The method of claim 17, wherein the second ring gear is connected to an output member that is connected to a rod; the rod is connected to a seat back; and the seat back is configured to rotate with the rod, the output member, and the second ring gear.

20. The method of claim 19, wherein the plurality of axes include a central axis and a planet gear axis for each of the one or more planet gears; wherein each planet gear axis is radially spaced from the central axis and circumferentially spaced from each other planet gear axis.

* * * * *